United States Patent
Kollin et al.

(10) Patent No.: US 8,754,831 B2
(45) Date of Patent: Jun. 17, 2014

(54) CHANGING BETWEEN DISPLAY DEVICE VIEWING MODES

(75) Inventors: Joel S. Kollin, Seattle, WA (US); Jaron Lanier, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 324 days.

(21) Appl. No.: 13/196,457

(22) Filed: Aug. 2, 2011

(65) Prior Publication Data
US 2013/0033485 A1 Feb. 7, 2013

(51) Int. Cl.
G09G 3/00 (2006.01)

(52) U.S. Cl.
USPC .......................................................... 345/32

(58) Field of Classification Search
USPC ............... 345/32, 55, 56, 60, 76, 82, 87, 204; 710/72
See application file for complete search history.

(56) References Cited

U.S. PATENT DOCUMENTS

| | | | | |
|---|---|---|---|---|
| 5,686,940 A | * | 11/1997 | Kuga | 345/156 |
| 6,072,443 A | * | 6/2000 | Nasserbakht et al. | 345/7 |
| 6,567,101 B1 | * | 5/2003 | Thomas | 345/649 |
| 7,595,933 B2 | | 9/2009 | Tang | |
| 7,869,109 B2 | | 1/2011 | Shin | |
| 8,203,577 B2 | * | 6/2012 | Hoover | 345/661 |
| 2002/0085287 A1 | * | 7/2002 | Egawa | 359/619 |
| 2002/0113912 A1 | | 8/2002 | Wright et al. | |
| 2003/0093600 A1 | | 5/2003 | Perala et al. | |
| 2003/0096648 A1 | * | 5/2003 | Ohno et al. | 463/32 |
| 2004/0164927 A1 | * | 8/2004 | Suyama et al. | 345/32 |
| 2005/0052628 A1 | * | 3/2005 | Ikeda et al. | 353/102 |
| 2008/0266530 A1 | | 10/2008 | Takahashi et al. | |
| 2009/0310858 A1 | | 12/2009 | Jupe | |
| 2010/0053069 A1 | | 3/2010 | Tricoukes et al. | |
| 2010/0117988 A1 | | 5/2010 | Jacobs et al. | |
| 2011/0148931 A1 | | 6/2011 | Kim | |

FOREIGN PATENT DOCUMENTS

| | | |
|---|---|---|
| JP | 2006202067 A | 8/2006 |
| WO | 2008117141 A1 | 10/2008 |

OTHER PUBLICATIONS

"International Search Report", Mailed Date: Jan. 23, 2013, Application No. PCT/US2012/047090, Filed Date: Jul. 17, 2012, pp. 10.
Pfeiffer, Thies., "Towards Gaze Interaction in Immersive Virtual Reality: Evaluation of a Monocular Eye Tracking Set-Up", Retrieved at <<http://www.google.co.In/url?sa=t&source=web&cd=1&ved=0CBoQFjAA&url=http%3A%2F%2Fciteseerx.ist.psu.edu%2Fviewdoc%2Fdownload%3Fdoi%3D10.1.1.157.8081%26rep%3Drep1%26type%3Dpdf&ei=HLeSTbXkNcSxhAfvuu2RDw&usg=AFQjCNG_Poi3OI0kGvNC45A5sRrcykQc2Q&sig2=MVFNG_Sa-f-Ufg1j1eHfg>>, Virtuelle und Erweiterte RealitatFunfter Workshop der GIFachgruppe VRAR, 2008, pp. 81-92.

(Continued)

Primary Examiner — Tom Sheng
(74) Attorney, Agent, or Firm — Dan Choi; Carole Boelitz; Micky Minhas

(57) ABSTRACT

Embodiments that relate facilitating the viewing of images on a mobile device are disclosed. For example, one disclosed embodiment provides a mobile device including a display screen and an image display system configured to selectively switch between a first viewing mode in which an image comprising a first amount of visual information is displayed at a first apparent distance from the display screen and a second viewing mode in which an image comprising a second, different amount of visual information is displayed at a second apparent distance from the display screen. The mobile device further includes a controller in communication with the image display system, wherein the controller is configured to switch between the first viewing mode and the second viewing mode.

20 Claims, 5 Drawing Sheets

(56) References Cited

OTHER PUBLICATIONS

Sherstyuk, et al., "Virtual Roommates in Ambient Telepresence Applications", Retrieved at <<http://www.google.co.in/url?sa=t&source=web&cd=1&ved=0CBYQFjAA&url=http%3A%2F%2Fciteseerx.ist psu.edu%2Fviewdoc%2Fdownload%3Fdoi%3D10.1.1.152.8483%26rep%3Drep1%26type%3Dpdf&ei=7LiSTZi4IpOyhAfCtsmFDw&usg=AFQjCNFIvBKSP7ANZWmZkjfkdQQ8zSKecA&sig2=WwS04I7dGb-uit4qr9mffA>>, In Proceedings of the 2008 International Conference on Artifical Reality and Telexistence, Dec. 1-3, 2008.

Siriborvornratanakul, et al., "A Portable Projector Extended for Object-Centered Real-Time Interactions", Retrieved at <<http://www.itl.t.u-tokyo.ac.jp/~thitirat/ipProjector/download/paper_CVMP2009.pdf>>, Proceedings of the Conference for Visual Media Production, 2009, pp. 118-126.

York, et al., "Human-computer interaction issues for mobile computing in a variable work context", Retrieved at <<http://www-ist.massey.ac.nz/~plyons/Papers%20(by%20others)/HCI/IssuesfYork%20Pendharkar%202004%20Human%20Computer%20Interaction%20Issues%20for%20Mobile%20Computing%20in%20a%20Variable%20Work%20Context%20.pdf>>, International Journal of Human-Computer Studies in HCI Issues in Mobile Computing, vol. 60, No. 5-6. May 2004, pp. 771-797.

Strickland, Jonathan., "Head-mounted Displays", Retrieved at <<http://electronics.howstuftworks.com/gadgets/other-gadgets/VR-gear1.htm>>, Retrieved Date: Mar. 30, 2011, pp. 3.

\* cited by examiner

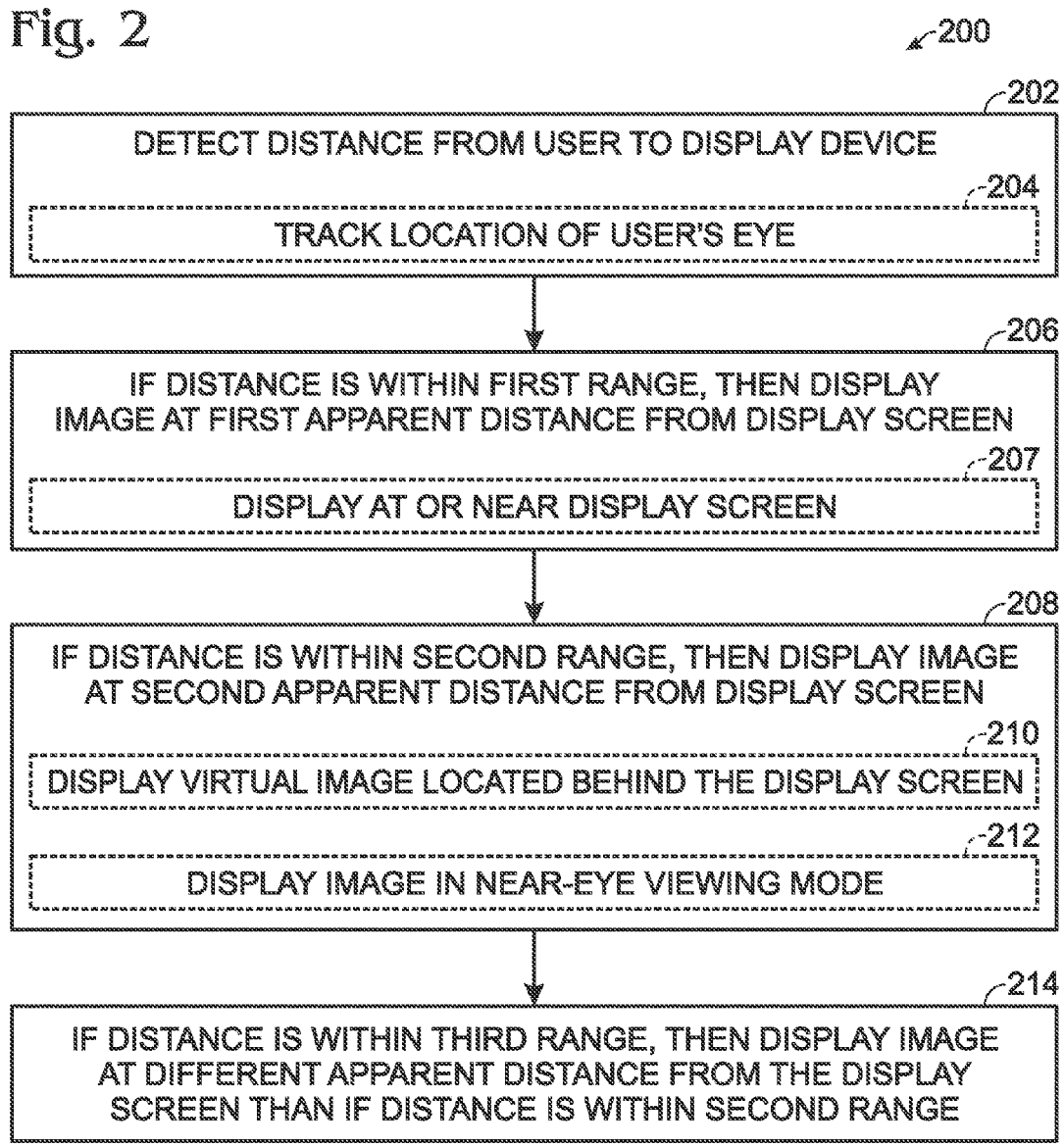
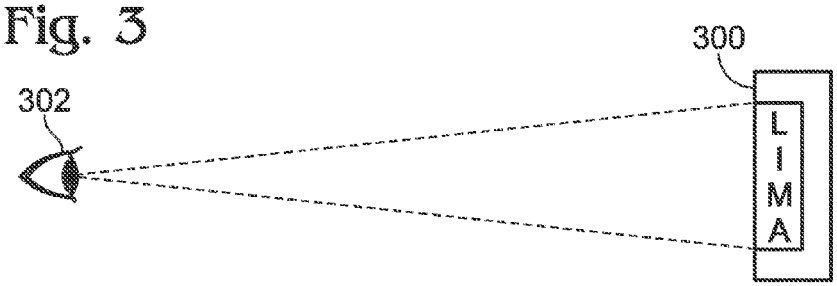

CHANGING BETWEEN DISPLAY DEVICE VIEWING MODES

BACKGROUND

The small screen sizes of some mobile devices, such as various smart phones and tablet computers, may pose challenges to a user trying to view images on such devices. For example, information-rich images such as documents, photographs, maps, etc., may have too much detail to be easily viewed in full on such a device. Thus, to facilitate viewing, a mobile device may be configured to allow a user to magnify a displayed image to reveal finer details. However, this may result in other portions of the image being moved off of the display screen thereby requiring a user to directionally scroll the image on the display to view such portions.

SUMMARY

Various embodiments are disclosed herein that relate to facilitating the viewing of images on a mobile device. For example, one disclosed embodiment provides a mobile device comprising a display screen and an image display system configured to selectively switch between a first viewing mode in which an image comprising a first amount of visual information is displayed at a first apparent distance from the display screen and a second viewing mode in which an image comprising a second, different amount of visual information is displayed at a second apparent distance from the display screen. The mobile device further comprises a controller in communication with the image display system, wherein the controller is configured to switch between the first viewing mode and the second viewing mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an embodiment of a method of operating a mobile device.

FIG. 3 shows a schematic depiction of an embodiment of a mobile device operating in a first viewing mode.

DETAILED DESCRIPTION

Figure 1:
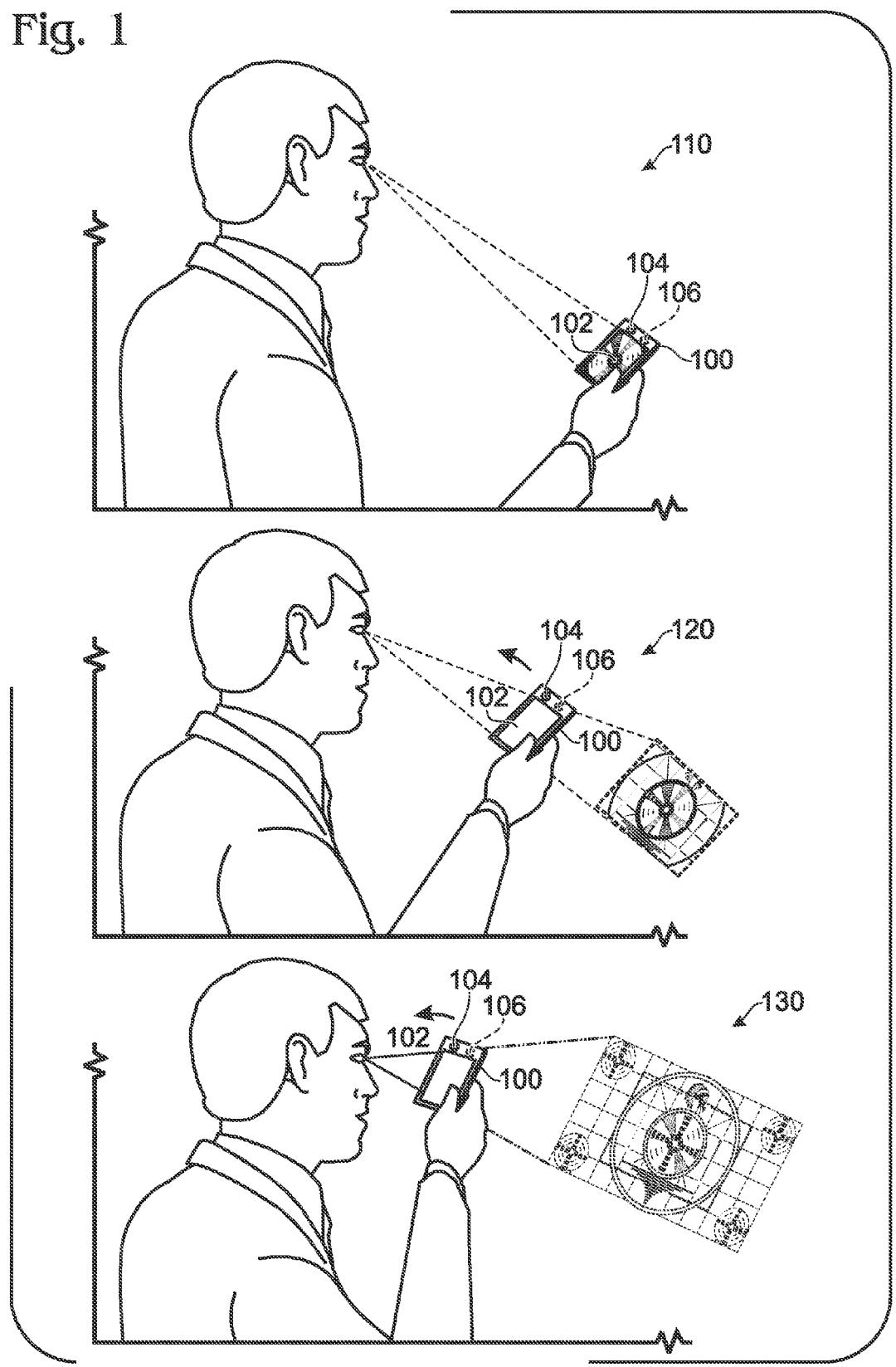
FIG. 1 shows a user viewing an embodiment of a mobile device at different distances.

As mentioned above, current mobile computing devices, such as smart phones, global positioning systems, portable media players, notepad computers, and the like, may allow a user to zoom in on a displayed image to view details of the image more easily. However, increasing the image magnification may result in the display of a smaller spatial area of the image, thereby requiring a user to scroll the image to view different portions of the image. Such zooming and scrolling may be inconvenient in many situations, and may obscure the visual relationship between the displayed portion of the image and other portions of the image. For example, when displaying a map of city streets, a mobile device user may find that the names of surface streets are not displayed at lower image magnifications. However, when the user increases the image magnification sufficiently to view the names of surface streets, information regarding the location of a particular surface street relative to navigational landmarks (e.g. nearby parks, major roads, etc.) may move off of the display, and therefore have to be scrolled into view. Similar difficulties may be encountered when viewing images of documents, photographic images, and other images with high spatial densities of information.

Accordingly, various embodiments are disclosed herein that relate to the use of different viewing modes to facilitate viewing images on a mobile device, wherein, in different viewing modes, images are displayed at different apparent distances from a display screen of the mobile device. For example, referring to the embodiment of FIG. 1, a mobile device 100 changes from a first viewing mode in which an image is displayed at or near the display screen 102 of the mobile device, as illustrated at 110, to a second viewing mode in which a virtual image is displayed with an image plane located behind the display screen of the mobile device 100, as illustrated at 120. In the depicted second viewing mode, the user may perceive the display screen 102 of the mobile device 100 as a window that offers a view of a larger, wider view image.

Additionally, the image in the second viewing mode may comprise a greater amount of visual information than the image in the first viewing mode. Thus a mobile device may be configured such that information that would ordinarily be manually scrolled into view in the first viewing mode may be seen without manually scrolling in the second viewing mode by moving the mobile device relative to the eye while viewing an image in the second mode, Feedback from motion sensors and/or image sensors may be used to control the display of the image by panning different parts of the image into view, changing a scale of the image, and/or changing an image plane of the image in response to such motions, it will be understood that this example is presented for the purpose of illustration, and is not intended to be limiting in any manner.

In some embodiments, a mobile device may be configured to switch between viewing modes automatically, for example, as a user moves the device closer to or farther from his or her eye. Likewise, in some embodiments a user nay switch between viewing modes manually, for example, by a hardware or software user interface control. Examples of such controls include, but are not limited to, touch-screen graphical user interface control(s), voice command(s), dedicated hardware button(s), etc.

The display of an image as a virtual image located behind the display screen 102 may allow a user to more easily view items that would not otherwise be fully displayable on a small mobile device screen. Further, this also may enable a user to view such items in a more natural way, as a user may simply tilt or move the mobile device 100 in horizontal, vertical, and/or depth directions to explore details of the image, as opposed to zooming and scrolling. In various embodiments, the virtual image plane may be fixed, or may be configured to vary, for example, as a function of a distance of a user's eye or face from the display screen. In embodiments in which the virtual image plane varies, some or all elements of a displayed virtual image may be space stabilized, such that the space-stabilized virtual image elements appear not to change distance laterally or in a depth direction relative to a user's eye as the user moves the display screen closer to and/or farther from the user's face. As such, a user may have the sensation of seeing a wider view of the image by moving the mobile device closer to the user's eye, as if moving closer to a window to see a wider view of what is behind the window.

In addition to or alternatively to displaying a virtual image behind the display screen, as a user moves the mobile device 100 closer to an eye, the mobile device may change to another type of virtual display mode, such as a near-eye viewing mode, as illustrated at 130 in FIG. 1. Examples of suitable near-eye imaging modes include, but are not limited to, Maxwellian view modes, retinal scanning display modes, and retinal holographic projection modes as well as eyepiece magnifiers such as discussed below.

Maxwellian view optics focus an image through an area of the pupil of a user's eye to form an image directly on the retina, such that the user perceives an image to be in focus regardless of the distance of the user from the device. The large effective depth of field of Maxwellian systems may benefit users with visual limitations such as presbyopia, and also reduce the adjustment needed for viewing. Maxwellian view optical systems are also very efficient in their use of light, resulting is much lower power consumption for a given level of brightness.

In a near-eye virtual display system, the user perceives a much larger, more immersive image compared to a real image displayed at the display screen 102. In this manner, a near-eye viewing mode may function similarly to a head-mounted display, but may offer various advantages compared to a head-mounted display, including portability, superior ergonomics for short-term usage, intuitive adjustment for a particular user's preferences, and integration into a commonly carried portable device. In addition to the examples above, it will be understood that any other suitable mechanism may be used to present a near-eye viewing mode, including but not limited to a virtual retinal display mechanism in which a laser is scanned onto the retina, a holographic retinal projection mechanism, an eyepiece such as the one described below, etc. Likewise, it will be understood that a mobile device may be configured to switch between any suitable number of viewing modes, and that an image plane of an image displayed by such a mobile device may vary within a continuous range of image locations and/or between two or more discrete locations.

In some embodiments, as mentioned above, data from one or more image sensors and/or motion sensors located on the mobile device 100 may be used to space-stabilize a virtual display mode image. This may permit a user to change a perspective of the image by naturally turning his or her head in tandem with, or relative to, the device, and/or moving the device closer to or farther from an eye. As a more specific example, referring to FIG. 1, a mobile device may comprise an image sensor 104 facing toward a user and an image sensor 106 facing away from the user when the user is looking at the display screen 102. In such an embodiment, the mobile device may be configured to compare changes in temporally correlated images from the image sensors 104, 106 to detect instances in which a user moves his or her head while maintaining the mobile device 100 at a relatively fixed position, and to pan a near-eye viewing mode image when such motion is detected. Typically, this is done to simulate the effect of having the display act as a window on a larger virtual image. Likewise, as described above, a user may move the display screen 102 closer to an eye to have the sensation of revealing a wider view of items located behind the display screen. It will be understood that, in some embodiments, a mobile device may utilize a conventional (direct) viewing mode and plural virtual image modes depending, for example, on a distance between the mobile display and the user's eye, as illustrated in FIG. 1, while in other embodiments, a mobile device may utilize a conventional viewing mode and a single virtual viewing mode.

In some embodiments, a mobile device may change between optical systems or paths used for image display when switching between a first viewing mode in which an image is displayed at or ear a display screen of the device, and a viewing mode where the image is located farther from the display screen. For example, a mobile device may utilize a switchable virtual image display system located between an image display device and the display screen, such that the virtual image display system may be switched off for the first viewing mode and switched on for the second viewing mode.

In other embodiments, a mobile device may utilize a single optical system or path, and vary an optical power of a virtual image display system to change between viewing modes. In such embodiments, the first viewing mode and second viewing mode each may utilize a virtual image, but the virtual image may have an apparent location closer to the display screen in the first viewing mode than in the second viewing mode. Example optical systems are discussed in more detail below.

FIG. 2 shows a flow diagram depicting an embodiment of a method 200 of operating a mobile device to change viewing modes based upon a distance between a user and the mobile device. Method 200 comprises, at 202, detecting a distance from a user to the display device. The distance may be detected in any suitable manner. For example, an image sensor may be used to acquire an image of a user, and the distance may be determined from the image data. As more specific examples, in some embodiments, the distance may be determined from detected proportions of facial features compared to known facial proportions, while in other embodiments, the distance may be detected via a depth image acquired by a depth-sensing camera (e.g. a time-of-flight, stereo, or structured light camera). It will be understood that these methods of detecting a distance between a user and a mobile detecting device are presented for the purpose of example, and are not intended to be limiting in any manner. Further, it will be understood that, in other embodiments, any other suitable input or inputs may be configured to trigger a viewing mode change, including but not limited to user inputs made via hardware and/or software controls.

Any suitable reference locations on the user's body may be used when determining the distance between the user and the mobile device. As a non-limiting example, and as indicated at 204, a user's eye may be located and tracked for distance detection. Tracking the location of the user's eye may facilitate the provision of a Maxwellian viewing mode image, or other near-eye viewing mode image to the user's eye.

Next, method 200 comprises, at 206, determining whether the distance between the user and the mobile device falls within a first range of distances, and if the distance falls within the first range of distances, then displaying the image in a first viewing mode in which the image is displayed at a first apparent image from the display screen. The first range of distances may have any suitable boundary or boundaries. For example, in some embodiments, the first range of distances may correspond to an ordinary viewing distance of a mobile phone, and may be defined as distances greater than a preselected threshold distance selected as being indicative of a user's intent to change modes. Further, in such embodiments, the first viewing mode may correspond to the display of an image at or close to the display screen, as indicated at 207.

On the other hand, as indicated at 208, if it is determined that the distance between the user and the mobile device falls within a second range of distances, then method 208 comprises displaying the image in a second viewing mode such that the image is displayed at a second apparent distance that is farther from the display screen than the first apparent distance. The second range of distances may likewise have any suitable boundary or boundaries. For example, in some embodiments, the second range of distances may correspond to any distance shorter than the lower threshold of the first viewing mode. In other embodiments, the second range of distance may correspond to an intermediate distance range between a threshold that triggers the second viewing mode and a threshold that triggers a third viewing mode. Likewise, it will be understood that other thresholds may be used to change to other additional viewing modes.

The second viewing mode may correspond to any suitable viewing mode in which an image is displayed at a different apparent distance from the display screen of a mobile device than in the first viewing mode. For example, as indicated at 210, in some embodiments, the second viewing mode may correspond to a virtual viewing mode in which to virtual image is displayed at an apparent distance behind the display screen. In other embodiments, as indicated at 212, the second viewing mode may correspond to a near-eye viewing mode, such as a Maxwellian view mode in which the light passing through the spatial light modulator is focused through the pupil of the user's eye to form an image on the retina. In yet other embodiments, the second viewing mode may correspond to a virtual retinal viewing mode in which a laser is scanned directly onto the retina of a user's eye, a retinal holographic projection mode in which an image of a hologram is focused at a user's pupil, a magnifying eyepiece, or any other suitable near-eye viewing technique.

Further, as mentioned above, in the first viewing mode, the image displayed may comprise a first amount of visual information, while in the second viewing mode, the image displayed may comprise a second, different amount of visual information. As a more specific example, additional detail and/or scope may be displayed when in the second viewing mode, such that a user may view the additional detail and/or scope by simply changing viewing modes (potentially in combination with using tilt, pan, etc, actions in a viewing mode), rather than by zooming, scrolling, or the like.

Figure 4:
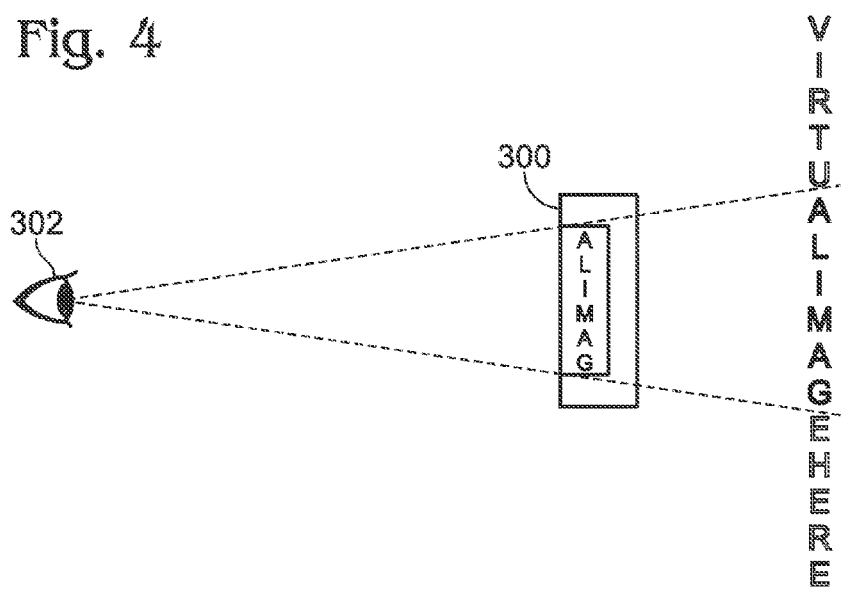
FIG. 4 shows a schematic depiction of the mobile device of FIG. 3 operating in a second viewing mode.
Figure 5:
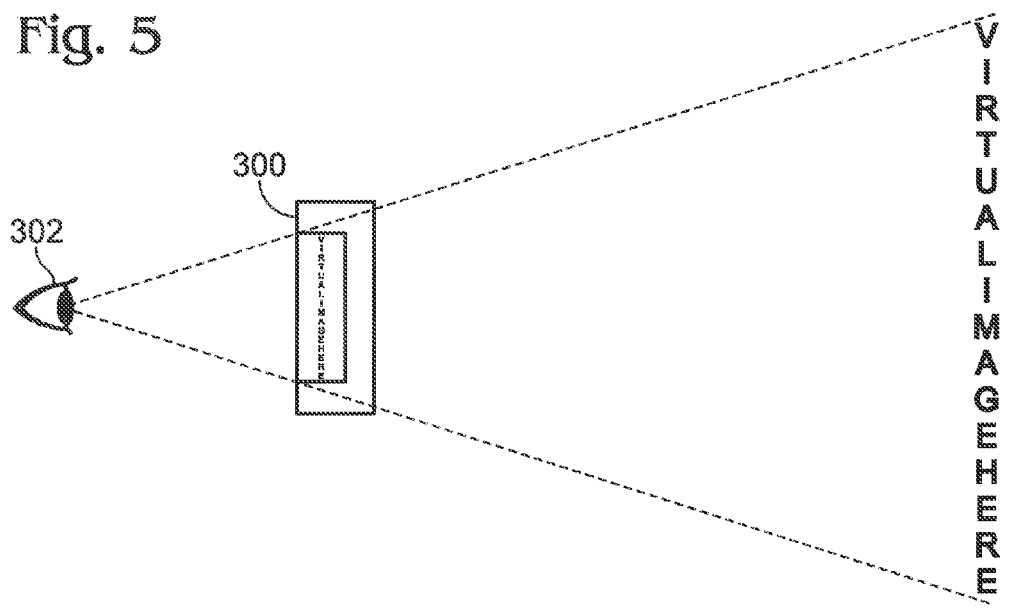
FIG. 5 shows a schematic depiction of the mobile device of FIG. 3 operating in a third viewing mode.

As mentioned above, in some embodiments, a mobile device may comprise three, or even more, viewing modes. Thus, method 200 may further comprise, if the distance between the mobile device and the user falls within a third range of distances that corresponds to such a third viewing mode, displaying the image at different apparent distance from the display screen than in the first and second view modes, as indicated at 212. As one no limiting example, referring first to FIG. 3, a mobile device may display an image located at or near the display screen 300 when a user 302 holds the mobile device at distance ordinarily used to view the mobile device. Then, when the user wants to view an image in more detail, the user may move the mobile device into closer view. Upon passing a threshold distance, the mobile device may change from the first viewing mode to a second, virtual image viewing mode, as illustrated in FIG. 4. As the user continues to move the mobile device into yet closer view, the mobile device may change from the second viewing mode into a third, near-eye viewing mode, such as a Maxwellian viewing mode or virtual retinal viewing mode, as illustrated in FIG. 5. In this manner, the user is presented with a wider apparent image at each subsequent viewing mode. Further, as mentioned above, variable power optics may be used to continuously change an apparent size and/or location of an image responsive to changes in the distance between the user and the mobile device, for example, to display the image at a location closer to apparent optical infinity as the display is moved closer to the eye. Alternatively, in such embodiments, as mentioned above, the image displayed to the viewer may be space-stabilized along a direction of depth as well as in horizontal and vertical directions via data from image sensors and/or other suitable sensors.

Figure 6:
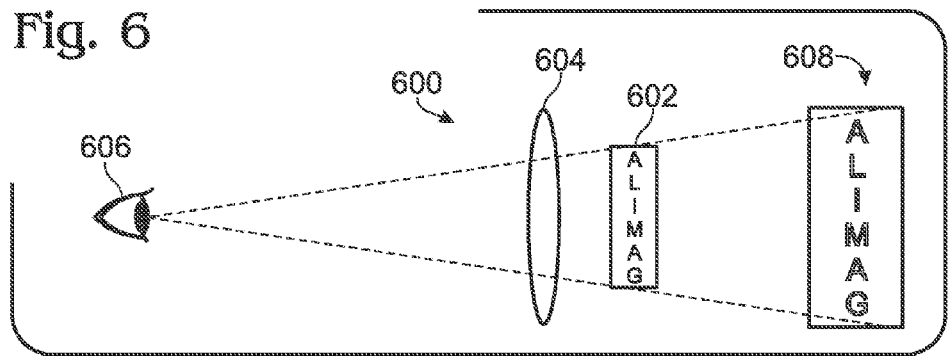
FIG. 6 shows a schematic depiction of an embodiment of a mobile device image display system that comprises a variable power lens system at a first focal length setting.
Figure 7:
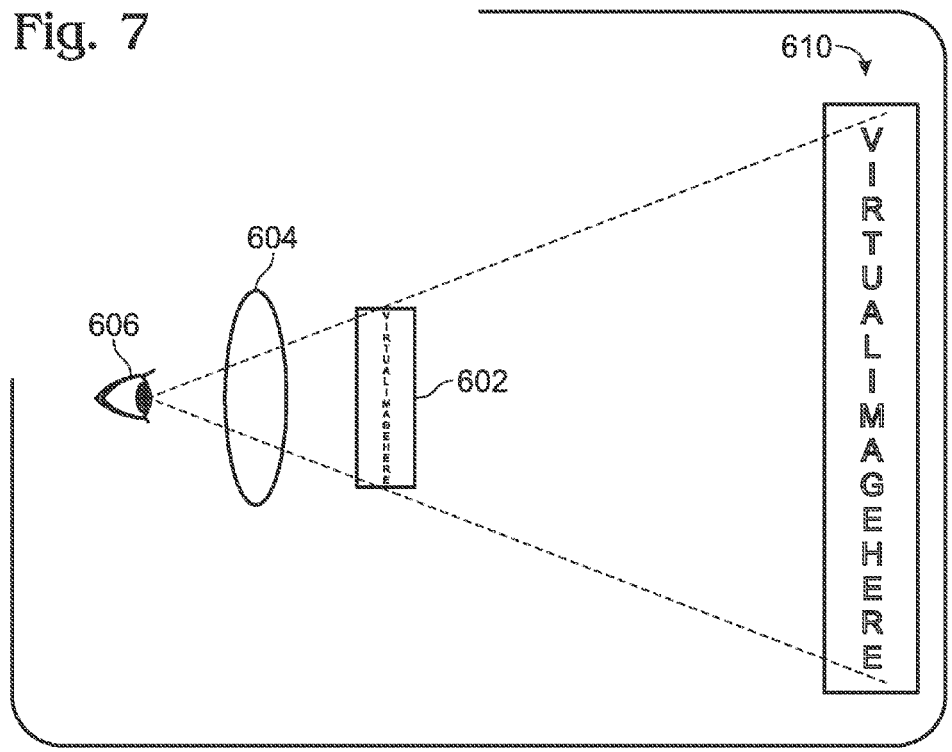
FIG. 7 shows the embodiment of FIG. 6 with the variable power lens system at a second focal length setting.

Any suitable optical system or combination of optical systems may be used to form a virtual image and change an apparent distance of the image from a mobile device display screen. FIGS. 6-7 illustrate an example embodiment of an optical system 600 configured to change a location of a virtual image. Optical system 600 comprises an image display device, such as a spatial light modulator 602 (e.g. a liquid crystal display (LCD)) or an emissive display such as an organic light emitting device (OLED), and a variable power lens system 604, illustrated schematically as a single lens, disposed between a user 606 and the image display device 602. Were the image display device 602, is subtractive, rather than emissive, the optical system 600 may further include a backlighting system (not shown). While shown for the purpose of illustration as a single convex lens, the variable power lens system 604 may have any suitable number and management of lenses and other optical components, and may include curved surfaces, as described below for the embodiment of FIG. 8, or diffractive optics. It will further be understood that the controllable components described in this and other embodiments may be controlled via a processor and/or other logic device(s) executing instructions stored in memory on the mobile device, as described in more detail below.

The variable power lens system 604 may utilize a first, lesser optical power to display a virtual image 608 in the first viewing mode at an apparent distance closer to a display screen when the user 606 is at a greater distance from the mobile device, as illustrated in FIG. 6, and a second, greater optical power to display a virtual image 610 in a second viewing mode at an apparent distance farther from a display screen when the user 606 is at a lesser distance from the mobile device, as illustrated in FIG. 7. Further, when displaying the image at the first, lesser optical power, the image display device 602 may be controlled to display an image at a higher content magnification (as opposed to optical magnification), such that a smaller portion of the overall image is displayed. Likewise, when displaying the image at the second, greater optical power, the image display device 602 may be controlled to display an image at a lower content magnification (as opposed to optical magnification), such that a greater portion of the overall image is displayed. By displaying more of the image while increasing the optical power, the user may have the perception of viewing a larger image located behind the display screen, as if looking through a window at the image. By smoothly varying the scaling of the display image in conjunction with the image magnification as a function of the distance between the user's eye and the display screen, the perception of seeing a stable virtual image may be enhanced. In addition, by changing the position of the virtual image as a function of the position of the display device in space, the image may be appear to be stable with respect to the outside world.

The variable power lens system 604 may utilize any suitable mechanism for varying an optical power of the lens system. For example, in some embodiments, the variable power lens system may utilize a lens with a switchable liquid crystal refractive or diffractive element.

Figure 8:
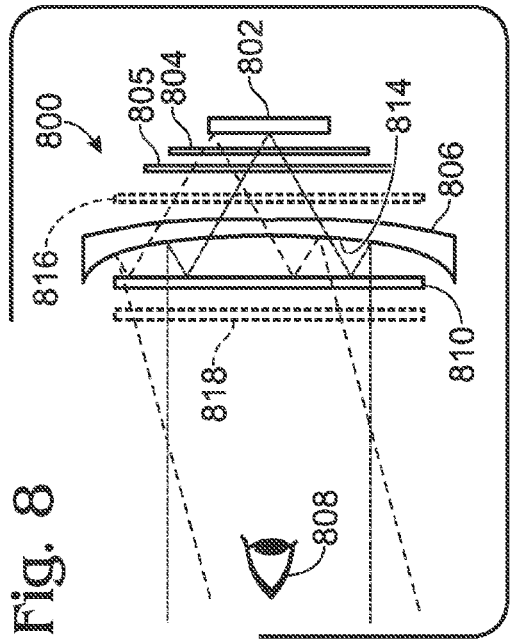
FIG. 8 shows an embodiment of a mobile device image display system configured to display a virtual image to a user.

Instead of a variable power lens system 604, other embodiments may utilize different optical systems to achieve different optical powers and produce different image planes. For example, FIG. 8 illustrates an example embodiment of an optical system 800 configured to form a virtual image of an image display device 802 located behind the optical system 800 by selectively directing light through a folded optical path based upon a polarization state of the light. Where the image display device 802 does not output polarized light, optical system 800 may comprise an absorbing, polarizer 804 configured to polarize tight output by the image display device 802. On the other hand, where the image display device 802 is an LCD or other device that outputs polarized light, the absorbing polarizer 804 may be omitted. Optical system 800 may further comprise a quarter wave plate 805 configured to circularly polarize light.

Optical system 800 further comprises a catadioptic element 806 located optically between image display device 802 and a display screen of a mobile display device, which may be considered in this example to be the surface of the mobile device at or through which a user 808 views an image. The catadioptic element 806 is configured to be partially transmissive so that at least some light from the image display device 802 passes through the catadioptic element. The catadioptic element 806 may have any suitable transmissivity to visible light. As one non-limiting example, the catadioptic element 806 may have a transmissivity of 0.5. Either surface of the catadioptic element 806 may be appropriately treated to form the desired transmissivity. Where one surface is treated to form the desired transmissivity, the other surface of the catadioptic element 806 may comprise an anti-reflective coating. Optical system 800 further comprises a reflective polarizer 810 positioned optically on an opposite side of the catadioptic element 806 as the image display device 802. It will be understood that the terms "optically positioned," "optically located," "optically between," and the like as used herein indicate relative locations along an optical path, rather than any specific spatial relationship, and that other components may be interspersed along an optical path between described components.

A virtual image of the image display device 802 may be formed as illustrated by the rays depicted in FIG. 8. First, polarized light from the image display device 802 passes through quarter wave plate 805, which circularly polarizes the light. A portion of the circularly polarized light then passes through the catadioptic element 806 to the reflective polarizer 810, which reflects the circularly polarized light back toward the catadioptic element 806. The light is then reflected from a concave surface 814 of the catadioptic element 806 back toward the reflective polarizer 810. Reflection of the light from the catadioptic element reverses the handedness of the circularly polarized light. The light reflected from the concave surface of the catadioptic element therefore can pass through the reflective polarizer to the user 808. Reflection of the light from the concave surface 814 creates a virtual image of the image produced by the image display device 802.

It will be understood that any other suitable optical system may be utilized to create a virtual image of the image display device. Examples include, but are not limited to, optical systems that utilize a reflective linear polarizer that selectively reflects light based upon a linear polarization state of the light, in combination with one or more quarter wave plates, polarizing filters, and a concave-surfaced catadioptic element, as used in some conventional infinity optics systems.

The optical system 800 further may be configured to be switched on or off via a controllable polarization rotator 816, such as a liquid crystal panel or Pi cell device, disposed optically between image display device 802 and catadioptic element 806. For example, when it is desired to display a virtual image in a second viewing mode, the controllable polarization rotator 816 may be set to a state in which light from the image display device 802 is reflected by the reflective polarizer 810. Likewise, when it is desired to exit the second viewing mode, the controllable polarization rotator 816 may rotate the polarization state of light from the image display device 802 by 90 degrees so that the light passes through the reflective polarizer 810 without reflecting. In this instance, the catadioptic element 806 may be configured to provide little or no optical power when operating in the first viewing mode. This may allow the image of the image display device 802 to be viewed as an image that appears at or near a display screen of the device in the first viewing mode, and as a more distant virtual image when operating in the second viewing mode, by selectively activating or deactivating controllable polarization rotator 816.

In other embodiments, an optional additional image display device 818 may be used as the display screen to display a real image in the first viewing mode. Referring to FIG. 8, such an additional display device 818 may be located between the reflective polarizer 810 and the user 808. As one example, a transparent OLED display may be positioned between optical system 800 and user 808 for displaying images in the first viewing mode. Such an OLED display may emit light to form an image in the first viewing mode, and may be passively transparent in the second viewing mode to permit viewing of the virtual image produced by optical system 800.

As another example, a LCD display may be used as an additional image display device 818. In such a mode, image display device 802 may be set to pass uniform white light from a backlight when operating in the first viewing mode to backlight additional image display device 818. Likewise, additional spatial light modulator 818 may be configured to pass all light from optical system 800 when operating in the second viewing mode to allow viewing of the virtual image. In some embodiments, one of the spatial light modulators may act as a digital electronic hologram that may be used to correct for aberrations and otherwise to adjust the backlighting, it will also be understood that the catadioptic element will typically be designed to reduce or correct aberrations in the images of one or more of the viewing modes by optimizing the surfaces and materials used in its construction.

In embodiments that utilize plural image display devices, such as image display devices 802 and 818, it will be understood that both image display, devices may be used in one or more viewing modes to display a composite image having multiple image planes. For example, an image display device utilizing an OLED as additional image display device 818 may display an image produced via image display device 818 over a virtual image produced via image display device 802. While two image display device are depicted in FIG. 8, it will be understood that a mobile device may include any other suitable number of image display devices configured to display images in any suitable number of image planes.

Figure 9:
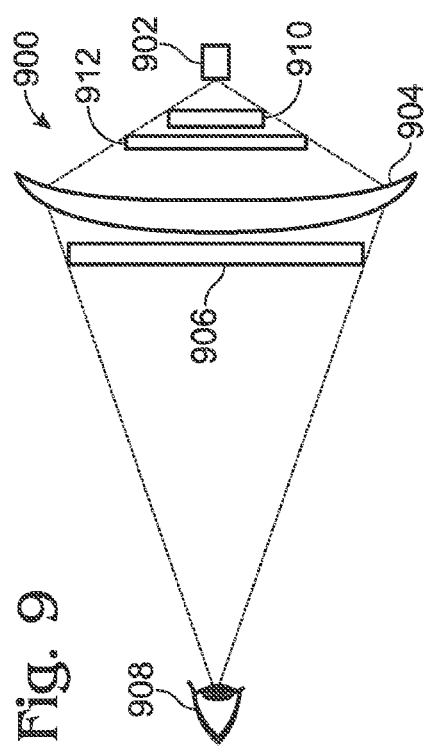
FIG. 9 shows an embodiment of a mobile device image display system configured to display a Maxwellian view mode image to a user.

FIG. 9 shows an example near-eye viewing system in the form of a Maxwellian view optical system 900 configured to present a Maxwellian view image to a user. The Maxwellian view optical system 900 comprises a controllable backlight system 902 configured to allow a location of a "point" source of light (e.g. a small spot of light) to be varied. This may allow the image of the point source forming the exit pupil of the projected Maxwellian view optical system to be moved to track movement of the user's eye relative to the mobile device display screen by controlling the location from which the backlighting is emitted. Any suitable lighting system may be used as controllable backlight system 902. Examples include, but are not limited to, an array of light-emitting diodes, an array of laser diodes a backlit spatial light modulator such as an LCD, or an emissive device such as an OLED. Further, in some embodiments, a single backlight may be utilized. It will be understood that such controllable backlight system 902 may be used for other viewing modes, wherein different portions of the backlight system may be illuminated for different viewing modes. For example, the entire backlight might be illuminated for a first image viewing mode where the image is displayed at or near the display screen 102.

The example Maxwellian view optical system 900 further comprises a converging lens 904, and a spatial light modulator 906 positioned optically on an opposite side of the converging lens 904 as the controllable backlight system 902. Light from the controllable backlight system 902 is focused by the converging lens 904 through the spatial light modulator 906 and toward the user's eye 908, in other embodiments, the spatial light modulator may have any other suitable location within the optical system. Further, in some embodiments, an image display device other than a spatial light modulator may be used.

In some embodiments, the Maxwellian view optical system 900 may comprise additional elements. For example, optical system 900 may include a digital electronic hologram 910 disposed optically between the controllable backlight system 902 and the spatial light modulator 906. Likewise, the Maxwellian view optical system 900 may further comprise one or more variable lens elements 912, such as a switchable lens, tunable lens, and/or diffractive optical element. The digital electronic hologram 910 and/or the variable lens element 912 may be controllable to perform such functions as changing focal length and steering light toward the user's eye as the user's eye moves. Such elements also may help to correct for optical system defects and aberrations. It will be understood that feedback from one or more on-board image sensors may be used to determine a distance of a user's eye from the mobile device to control the backlight system, the spatial light modulator, variable lenses, diffractive optical elements, digital electronic holograms, etc.

It will be understood that the embodiments described herein may be customizable to adapt to an individual user's taste and visual abilities. This may allow users to mitigate problems such as presbyopia (by changing the apparent distance of a virtual image) and macular degeneration (by changing the scale and contrast of a displayed image).

As mentioned above, the disclosed embodiments may be utilized with any suitable mobile device, including but not limited to smart phones and notepad computers. In the case of a notepad computer or other larger format mobile devices, the larger display screen size may enable additional use scenarios. For example, eye tracking may be used to track both of a user's eyes, and an autostereoscopic image may be displayed to the user by sequentially directing left-eye and right-eye images to the user via a Maxwellian view optical system and an intelligent time-multiplexed backlighting system. Further, it will be understood that the optical systems herein and the methods for switching between viewing modes array be used in any other suitable display device than the aforementioned mobile devices.

A time-sequential or other autostereoscopic technique may be employed for a smaller format mobile device, such as a smart phone, as well. For example, an autostereoscopic technique may be used to direct different views to each of the user's eyes for the viewing mode shown at 120 in FIG. 1 via time-multiplexed control of the backlighting system and the image display device, as each eye would see slightly different views through the window defined by display screen 102 if the virtual image lies behind the display 102. Note that this is the case even if the virtual image has no depth component as the difference between the left-eye image and the right-eye image may correspond to a translation of the viewable area of the virtual image to match the perspective defined by the position of each eye relative to the display screen. However, it will be readily understood that this also enables display of a 3D image through image disparity in a similar manner, as is the case with other stereoscopic and autostereoscopic systems. It will further be understood that separate left-eye and right-eye images may be produced either by displaying separate images in (for example) a time-multiplexed mariner, or (for an image with no disparity) by displaying a single image while changing backlighting of a spatial light modulator image, so that each eye sees a different subset of the image information corresponding to the position of each eye relative to the display window.

Figure 10:
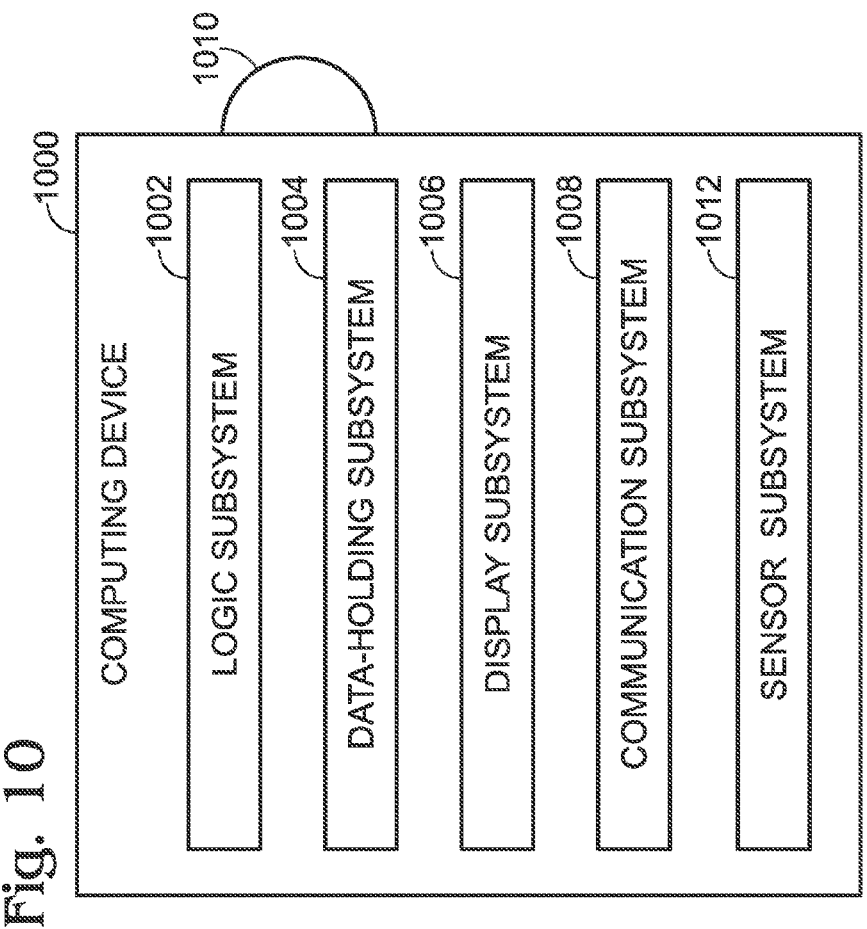
FIG. 10 shows a block diagram of an embodiment of mobile device.

FIG. 10 schematically illustrates a nonlimiting embodiment computing system 1000 that may perform one or more of the above described methods and processes. Computing system 1000 is shown in simplified form, and may represent any suitable type of computing device, including but not limited to mobile devices such as smart phones, notepad computers, portable media players, laptop computers, global positioning system receivers, etc. It is to be understood that virtually any computer architecture may be used without departing from the scope of this disclosure.

Computing system 1000 includes a logic subsystem 1002 and a data-holding subsystem 1004. Computing system 1000 may optionally include a display subsystem 1006, communication subsystem 1008, and/or other components not shown in FIG. 10.

Computing system 1000 may also optionally include user input devices such as keyboards, microphones, and/or touch screens, for example. In some embodiments, a computing system 1000 with a touch screen input may be configured to distinguish between touch inputs and hover inputs in which a finger or other manipulator is positioned close to but spaced from a display screen of the device. Various methods may be used to distinguish between touch and hover inputs. For example, an optical sensor, such as a sensor-in-pixel LCD display, combined with a variable diffuser, may be used to optically detect touches by acquiring image data at varying diffusivities. In this manner, touch inputs will appear sharply defined at strong and weak diffusivities, while hover inputs may be obscured at stronger diffusivities. Likewise, a combination of sensing technologies, including but not limited to combinations of optical and resistive, or optical and capacitive, touch detection may be used to distinguish between touch and hover inputs.

Logic subsystem 1002 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1002 may include one or more processors that are configured to execute software instructions. Additionally or alternatively, the logic subsystem 1002 may include one or more hardware or firmware logic machines configured to execute hardware or firmware instructions. Processors of the logic subsystem 1002 may be single core or multicore, and the programs executed thereon may be configured for parallel or distributed processing.

Data-holding subsystem 1004 may include one or more physical, non-transitor devices configured to hold data and/or instructions executable by the logic subsystem to implement the herein described methods and processes. When such methods and processes are implemented, the state of data-holding subsystem 1004 may be transformed (e.g., to hold different data).

Data-holding subsystem 1004 may include removable media and/or built-in devices. Data-holding subsystem 1004 may include optical memory devices CD, DVD, HD-DVD Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1004 may include devices with one or more of the following characteristics: volatile, nonvolatile, dynamic, static, read/write, read-only, random access, sequential access, location addressable, file addressable, and content addressable. In some embodiments, logic subsystem 1002 and data-holding subsystem 1004 may be integrated into one or more common devices, such as an application specific integrated circuit or a system on a chip.

FIG. 10 also shows an aspect of the data-holding subsystem in the form of removable computer-readable storage media 1010, which may be used to store and/or transfer data and/or instructions executable to implement the herein described methods and processes. Removable computer-readable storage media 1010 may take the form of CDs, DVDs, HD-DVDs, Blu-Ray Discs, EEPROMs, and/or floppy disks, among others.

It is to be appreciated that data-holding subsystem 1004 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

As described above, display subsystem 1006 includes one or more image display systems configured to present a visual representation of data held by data-holding subsystem 1004, and to change between two or more viewing modes in which images of such data are presented at different apparent distances from a display screen. As the herein described methods and processes change the data held by the data-holding subsystem, and thus transform the state of the data-holding subsystem, the state of display subsystem 1006 may likewise be transformed to visually represent changes in the underlying data.

Communication subsystem 1008 may be configured to communicatively couple computing system 1000 with one or more other computing devices. Communication subsystem 1008 may include wired and/or wireless communication devices compatible with one or more different communication protocols. As nonlimiting examples, communication subsystem 1008 may be configured for communication via a wireless telephone network, a wireless local area network, a wired local area network, a wireless wide area network, a wired wide area network, etc. In some embodiments, communication subsystem 1008 may allow computing system 1000 to send and/or receive messages to and/or from other devices via a network such as the Internet.

Computing system 1000 further comprises a sensor subsystem 1012 including one or more sensors configured to sense one or more use environment states. For example, the sensor subsystem 1012 may comprise one or more image sensors configured to acquire images facing toward and/or away from a user, motion sensors such as accelerometers that may be used to track the motion of the device, and/or any other suitable sensors. As described above, such image data, motion sensor data, and/or any other suitable sensor data may be used to perform such tasks as determining a distance between a user and the display screen of the display subsystem 1006, space-stabilizing an image displayed by the display subsystem 1006, etc.

It is to be understood that the configurations and/or approaches described herein are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non obvious combinations and subcombinations of the various processes, systems and configurations, and other features functions, acts, and/or properties disclosed herein, as well as any and all equivalents thereof.

We claim:

1. A display device, comprising:
a display screen;
an image display system configured to display an image via the display screen and to switch between a first viewing mode in a which an image comprising a first amount of visual information is displayed at a first apparent distance from the display screen and a second viewing mode in which an image comprising a second, different amount of visual information is displayed at a second apparent distance from the display screen; and
a controller in communication with the image display system, the controller comprising
a logic subsystem, and
a data-holding subsystem comprising instructions executable by the logic subsystem to switch between the first viewing mode and the second viewing mode.

2. The display device of claim 1, further comprising a user proximity detection system configured to sense a distance of a user from the display device, and wherein the controller is configured to switch between the first viewing mode and the second viewing mode based upon the distance of the user from the display device.

3. The display device of claim 1, further comprising a first camera configured to face toward a user viewing the display screen and a second camera configured to face away from the user viewing the display screen, and wherein the controller is configured to space-stabilize an image presented to the user based upon data from the first camera and the second camera.

4. The display device of claim 1, wherein the second view mode comprises a virtual view mode in which a virtual image located behind the display screen from a perspective of a user is displayed.

5. The display device of claim 4, wherein the image display system comprises:
- an image display device;
- an optical element with a concave surface positioned optically between the image display device and the display screen; and
- a reflective polarizer positioned optically on an opposite side of the optical element as the image display device.

6. The display device of claim 5, wherein the image display system further comprises a controllable polarization rotator positioned optically between the optical element and the image display device, and wherein the controller is configured to switch between the first viewing mode and the second viewing mode by switching the controllable polarization rotator.

7. The display device of claim 1, wherein the controller is configured to switch between the first viewing mode and the second viewing mode based upon an input received via one or more of a software user interface control and a hardware user interface control.

8. The display device of claim 1, wherein the second viewing mode is a near-eye viewing mode.

9. The display device of claim 1, wherein the image display system comprises a Maxwellian viewing mode.

10. The display device of claim 1, wherein the controller comprises instructions executable to display an autostereoscopic image by sequentially directing left-eye and right-eye images to a user.

11. The display device of claim 1, further comprising a controllable backlight system controllable by the controller to vary a location at which light is emitted by a backlight based upon a detected location of a user's eye.

12. The display device of claim 1, wherein the second viewing mode is a virtual image viewing mode, and wherein the image display system further comprises a third viewing mode in the form of a near-eye viewing mode.

13. The display device of claim 1, wherein the image display system includes a first image display device configured to display an image at a first image plane and a second image display device configured to display an image at a second image plane.

14. The display device of claim 1, wherein the image display system comprises a variable power lens system, and wherein the controller is configured to switch between the first viewing mode and the second viewing mode by varying a power of the variable power lens system.

15. In a mobile device, a method of displaying images, the method comprising:
- detecting a distance from a user to the mobile device;
- if the distance is within a first range of distances from the mobile device, then displaying the image in a first viewing mode in which the image is located at a first apparent distance from the display screen of the mobile device; and
- if the distance is within a second range of distances from the display device, then displaying the image in a second viewing mode in which the image is located at a second apparent distance from the display screen of the mobile device.

16. The method of claim 15, wherein displaying the image in the first viewing mode comprises displaying the image at or near the display screen of the display device, and wherein displaying the image in the second viewing mode comprises displaying the image as a virtual image located behind the display screen from the user's perspective at a greater apparent distance from the display screen than in the first viewing mode.

17. The method of claim 15, wherein displaying the image in the second viewing mode comprising displaying the image in a near-eye viewing mode.

18. The method of claim 15, further comprising acquiring an image of the user via an image sensor and then detecting a position of an eye of the user via the image of the user.

19. A mobile device, comprising:
- a display screen;
- a user proximity detection system configured to sense a distance of a user from the mobile device;
- an image display system configured to display an image via the display screen and to selectively switch between a first viewing mode in which an image is displayed at the display screen and a second viewing mode in which an image is displayed at an apparent distance behind the display screen, the image display system comprising
  - an image display device,
  - a catadioptic element comprising a concave surface positioned optically between the image display device and the display screen, and
  - a reflective polarizer positioned optically between the concave surface and the display screen; and
- a controller in communication with the user proximity detection system and the image display system, the controller comprising
  - a logic subsystem, and
  - a data-holding subsystem comprising instructions executable by the logic subsystem to switch between the first viewing mode, the second viewing mode, and a third viewing mode based upon the distance of the user from the mobile device.

20. The mobile display system of claim 19, wherein the image display system is configured to switch to a third viewing mode in which an image is displayed in a near-eye view mode based upon the distance of the user from the mobile device.

* * * * *